United States Patent Office 2,776,238
Patented Jan. 1, 1957

2,776,238

BACTERICIDE COMPOSITION AND METHOD OF USING SAME

Gerald I. Keim, Oxford, Pa., assignor to Hercules Powder Company, Wilmington, Del., a corporation of Delaware No Drawing. Application May 1, 1953,
Serial No. 352,571

17 Claims. (Cl. 167—30)

This invention relates to a new pest control composition and more particularly to a new bactericide comprising a salt of a rosin amine derivative.

In accordance with this invention it has been found that a composition containing an N-($\gamma$-aminopropyl) rosin amine coordinate covalent salt, particularly an acetate salt, is a very effective bactericide and that a composition containing an N-($\gamma$-aminopropyl) rosin amine diacetate is particularly suitable for this purpose. The composition of this invention comprises a solution or dispersion of an N-($\gamma$-aminopropyl) rosin amine salt in a liquid, the latter being a bactericidal adjuvant and acting as a carrier for the salt. Any liquid in which the salt may be dissolved or dispersed will behave as a bactericidal adjuvant. Water is particularly preferred for this purpose and an aqueous solution of N-($\gamma$-aminopropyl) hydrogenated rosin amine diacetate is the preferred composition of this invention due to its superior bactericidal activity.

The following examples illustrate the preparation of the N-($\gamma$-aminopropyl) rosin amine acetate salts of this invention. All parts are on the basis of parts by weight.

*Example 1*

A mixture of 100 parts disproportionated rosin amine and 75 parts acrylonitrile was placed in a glass container and sealed. The mixture was then heated at about 90° C. under autogenous pressure for 16 hours. The excess of unreacted acrylonitrile was removed by heating at 90° C. for 1 hour at 20 mm. pressure. The resulting product amounted to 117 parts and had a nitrogen analysis of 7.7% and a molecular weight of 331.

A mixture of 100 parts of the product, which was N-($\beta$-cyanoethyl) disproportionated rosin amine, in 100 parts methyl cyclohexane as solvent was placed in a hydrogenation autoclave with 15 parts Raney nickel catalyst. To this mixture was then added 15 parts by weight ammonia and then hydrogen up to 3000 lb./sq. in. pressure. The autoclave was heated to 120° C. while rocking and held at that temperature for 4 hours. The maximum pressure was 5000 lb./sq. in. The product was removed from the catalyst by filtration and was recovered as the residue after distilling off the solvent. It was a viscous liquid which analyzed 7.22% nitrogen and had a neutral equivalent of 190. It was soluble in 5% acetic acid and very soluble in 5% formic acid. The analysis and solubility data showed the product to be N-($\gamma$-aminopropyl) disproportionated rosin amine.

*Example 2*

To 160 parts of N-($\gamma$-aminopropyl) rosin amine, prepared from disproportionated rosin in accordance with Example 1 and having a neutral equivalent of 190, and 90 parts of water was added 50 parts of glacial acetic acid with stirring. There was produced a paste containing 70% N-($\gamma$-aminopropyl) disproportionated rosin amine diacetate which was suitable for dilution with water to any desired concentration.

*Example 3*

To 9.93 parts of N-($\gamma$-aminopropyl) rosin amine prepared from a substantially completely hydrogenated rosin in a manner similar to Example 1 and having a neutral equivalent of 193.5 was added about 7 parts of water and 3.09 parts of glacial acetic acid. The mixture was stirred vigorously and additional water added to give a total weight of 130.2 parts. There was produced a 10% solution of N-($\gamma$-aminopropyl) hydrogenated rosin amine diacetate.

*Example 4*

N-($\gamma$-aminopropyl) disproportionated rosin amine, having a neutral equivalent of 187, in the amount of 12.1 parts and 6 parts of water were stirred with 1.9 parts of glacial acetic acid. There was produced a paste containing 70% N-($\gamma$-aminopropyl) disproportionated rosin amine monoacetate which was suitable for dilution with water to any desired concentration.

The rosin amine from which the N-($\gamma$-aminopropyl) rosin amine salts of this invention are prepared are the primary rosin amines which are prepared by reacting ammonia with a natural rosin or modified rosin to form the nitrile from the carboxyl group in the rosin and then hydrogenating the rosin nitrile or the modified rosin nitrile to form the amine. The preparation of the nitrile may be carried out by passing gaseous ammonia into the molten rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from any natural rosin or modified rosin such as gum rosin, wood rosin, hydrogenated rosin, dehydrogenated or disproportionated rosin, or heat-treated rosin. The rosin nitriles may likewise be made from the rosin acids which are major constituents of these rosins such as abietic acid, dihydroabietic acid, dehydroabietic acid, and tetrahydroabietic acid.

The resin acid nitriles prepared from the natural or modified rosins or the corresponding rosin acids are readily hydrogenated to the amines. The hydrogenation is usually carried out by heating the rosin nitrile at about 150° to 200° C. with a Raney nickel catalyst under hydrogen pressure up to about 8000 lb./sq. in. The hydrogenation may also be carried out using other catalysts such as Raney cobalt, supported nickel or cobalt catalysts and noble metal catalysts such as platinum, palladium, palladium-on-carbon, or reduced platinum oxide. The reaction may be carried out under hydrogen pressure of from about 200 to 8000 lb./sq. in. and at a temperature of from about 20° C. to about 200° C. Solvents may be used if desired and are preferable at the lower temperatures. The hydrogenation may also be carried out in the presence or absence of ammonia. Although the hydrogenation is ordinarily carried out only to the extent of hydrogenation of the nitrile group which hydrogenates quite readily, the hydrogenation may also be carried out under such conditions of temperature, pressure, and time of hydrogenation as to hydrogenate the rosin amines which are produced to convert them to hydrorosin amines which correspond to the amines produced from hydrogenated rosin via the nitriles. The rosin amine is converted to N-($\gamma$-aminopropyl) rosin amine by reaction with acrylonitrile followed by hydrogenation to the amine.

The N-($\gamma$-aminopropyl) rosin amine salts which are preferred in this invention are the coordinate covalent salts of N-(γ-aminopropyl) rosin amine, that is, the salts of the amine prepared by addition of an acid to the amine as shown in the examples.

By the term "N-(γ-aminopropyl) rosin amine" is meant the N-(γ-aminopropyl) derivative of a rosin amine prepared from natural rosin or a stabilized rosin. The term "N-(γ-aminopropyl) stabilized rosin amine" refers to an N-(γ-aminopropyl) rosin amine having a ring structure of a stabilized rosin acid such as dehydro-, dihydro- or tetrahydro-abietic acid or a mixture of such amines. The term "N-(γ-aminopropyl) disproportionated rosin amine" refers to a mixture which is chiefly N-(γ-aminopropyl) dihydrorosin amine and N-(γ-aminopropyl) dehydrorosin amine.

The N-(γ-aminopropyl) rosin amine salt compositions of this invention are of particular interest because of their bactericidal activity with respect to both aerobic and anaerobic bacteria. These compositions are particularly effective against sulfate-reducing bacteria and field tests indicate that the compounds of this invention are also very useful in controlling bacteria such as E. typhosa. In combating E. typhosa, N-(γ-aminopropyl) hydrogenated rosin amine diacetate was found to have a phenol coefficient of 555 and the product N-(γ-aminopropyl) disproportionated rosin amine diacetate exhibited a phenol coefficient of 333. The phenol coefficient of N-(γ-aminopropyl) disproportionated rosin amine monoacetate amounted to 253 against the basteria E. typhosa.

The bactericidal compositions of this invention comprise an N-(γ-aminopropyl) rosin amine salt and a diluent. Any diluent which will permit dispersion of the N-(γ-aminopropyl) rosin amine salts will behave as a bactericidal adjuvant and may be utilized as a carrier therefor. Water is particularly preferred as a diluent, but other suitable solvents such as gasoline, benzene, alcohol, acetone, kerosene, pine oil, etc., may be utilized to prepare solutions or dispersions of the active ingredient. In the case of media in which the salts of the invention are not readily soluble, solubilizers may be added to effect dispersions. In aqueous media any water-soluble nonionic emulsifying agent may be utilized as a solubilizer. Rosin-ethylene oxide condensates and rosin amine-ethylene oxide condensates, which are soluble in water, are useful for this purpose. In certain brines and in waters containing sulfates and phosphates, it has been found that a disproportionated rosin amine-ethylene oxide condensate containing 11 moles ethylene oxide per mole of disproportionated rosin amine is effective as a solubilizing agent. The diluent in any given case will be determined by the particular circumstances of use as will the concentration of active ingredient.

In addition to the acetate and diacetate salts of N-(γ-aminopropyl) rosin amine, other salts may be utilized. The corresponding formate, glycolate, hydrochloride, monochloroacetate, etc. salts may also be utilized effectively in combating bacteria. Besides E. typhosa, other bacteria such as, for example, S. aureus, E. coli, B. sulphureus, B. coli communis, etc., may be controlled with the compositions of this invention.

The products of this invention are useful in water systems where pipes and other conduits suffer from corrosion due to aerobic and anaerobic bacteria. N-(γ-aminopropyl) rosin amine salts have been found effective in eliminating corrosion due to bacteria and will be found useful in the petroleum industry as well as in sewage disposal systems.

The compositions of this invention may be applied to surfaces to be protected by dipping, spraying, painting, etc. or added to a diluent coming in contact with such surfaces. In a liquid carrying or containing system the compositions need merely be circulated in the system whereby it will be dispersed and distributed by natural forces to the contact surfaces requiring protection. Control of bacteria with the compositions is both simple and effective.

This application is a continuation-in-part of my application Serial No. 334,360, now U. S. 2,686,776, filed January 30, 1953 which in turn is a continuation-in-part of my application Serial No. 197,510 (now abandoned) filed November 24, 1950.

What I claim and desire to protect by Letters Patent is:

1. A bactericide composition comprising an unsubstituted N-(γ-aminopropyl) rosin amine acetate and a bactericidal adjuvant selected from the group consisting of acetone, alcohol, benzene, gasoline, kerosene, pine oil and water.

2. A bactericide composition comprising an unsubstituted N-(γ-aminopropyl) rosin amine monoacetate and a bactericidal adjuvant selected from the group consisting of acetone, alcohol, benzene, gasoline, kerosene, pine oil and water.

3. A bactericide composition comprising N-(γ-aminopropyl) disproportionated rosin amine acetate and a bactericidal adjuvant selected from the group consisting of acetone, alcohol, benzene, gasoline, kerosene, pine oil and water.

4. A bactericide composition comprising N-(γ-aminopropyl) hydrogenated rosin amine acetate and a bactericidal adjuvant selected from the group consisting of acetone, alcohol, benzene, gasoline, kerosene, pine oil and water.

5. A bactericide composition comprising N-(γ-aminopropyl) dehydrogenated rosin amine acetate and a bactericidal adjuvant selected from the group consisting of acetone, alcohol, benzene, gasoline, kerosene, pine oil and water.

6. A bactericide composition comprising an unsubstituted N-(γ-aminopropyl) rosin amine diacetate and a bactericidal adjuvant selected from the group consisting of acetone, alcohol, benzene, gasoline, kerosene, pine oil and water.

7. A bactericide composition comprising N-(γ-aminopropyl) disproportionated rosin amine diacetate and a bactericidal adjuvant selected from the group consisting of acetone, alcohol, benzene, gasoline, kerosene, pine oil and water.

8. A bactericide composition comprising N-(γ-aminopropyl) hydrogenated rosin amine diacetate and a bactericidal adjuvant selected from the group consisting of acetone, alcohol, benzene, gasoline, kerosene, pine oil and water.

9. A bactericide composition comprising N-(γ-aminopropyl) dehydrogenated rosin amine diacetate and a bactericidal adjuvant selected from the group consisting of acetone, alcohol, benzene, gasoline, kerosene, pine oil and water.

10. A bactericide composition comprising an aqueous solution of N-(γ-aminopropyl) disproportionated rosin amine diacetate.

11. A method of inhibiting growth of bacteria in a water-carrying system which comprises adding to said system N-(γ-aminopropyl) disproportionated rosin amine diacetate.

12. A method of inhibiting growth of bacteria in a liquid-carrying system which comprises circulating in said system an unsubstituted N-(γ-aminopropyl) rosin amine acetate.

13. A bactericide composition comprising a salt of an unsubstituted N-(γ-aminopropyl) rosin amine and an acid selected from the group consisting of acetic acid, formic acid, glycolic acid, monochloroacetic acid and hydrochloric acid, and a bactericidal adjuvant selected from the group consisting of acetone, alcohol, benzene, gasoline, kerosene, pine oil and water.

14. A method for inhibiting growth of bacteria in a liquid-carrying system which comprises adding to said system a salt of an unsubstituted N-(γ-aminopropyl)

rosin amine and an acid selected from the group consisting of acetic acid, formic acid, glycolic acid, monochloroacetic acid and hydrochloric acid.

15. A bactericide composition comprising an aqueous solution of an unsubstituted N-(γ-aminopropyl) rosin amine monoacetate.

16. A bactericide composition comprising an aqueous solution of an unsubstiuted N-(γ-aminopropyl) hydrogenated rosin amine diacetate.

17. A bactericide composition comprising an aqueous solution of an unsubstituted N-(γ-aminopropyl) dehydrogenated rosin amine diacetate.

References Cited in the file of this patent

UNITED STATES PATENTS

| | | |
|---|---|---|
| 2,490,924 | Schertz | Dec. 13, 1949 |
| 2,490,925 | Schertz | Dec. 13, 1949 |
| 2,688,609 | Keim | Sept. 7, 1954 |